Dec. 30, 1958  C. L. POWELL  2,866,651
VEHICLE WHEEL SUSPENSION MEANS
Filed June 29, 1956  2 Sheets-Sheet 1

INVENTOR
CHARLES L. POWELL
BY Semmes & Semmes
ATTORNEYS

United States Patent Office 2,866,651
Patented Dec. 30, 1958

2,866,651

VEHICLE WHEEL SUSPENSION MEANS

Charles L. Powell, West Palm Beach, Fla.

Application June 29, 1956, Serial No. 594,805

3 Claims. (Cl. 280—96.2)

The present invention relates broadly to suspension means, and more particularly to movable suspension means for movably mounting and supporting a mechanism, and constitutes an improvement of the invention disclosed in my copending application Serial No. 527,264, filed August 9, 1955, now Patent No. 2,767,998.

In my above-named application, means were disclosed whereby a mechanism or article was so suspended as to be movable rectilinearly in a straight line and positively preventing and eliminating compound directions of movement. The invention therein described, and the present invention, are particularly adapted for mounting wheels on vehicles, such as automobiles, and primarily the front wheels of the vehicles which are individually mounted and individually movable up or down independent of movement of each other.

It is a primary object of the present invention to provide an improved structure with respect to that disclosed in my previous application, and adapted to eliminate excessive wear on the front wheels of present type automobiles which in present constructions are forced inward and outward to such an extent that it causes the rubber to wear out, necessitating switching of tires from front to rear due to uneven wear, and shortening the life of all of the tires on the car by a substantial amount. Such excessive wear is due to the fact that the upper and lower wheel suspension assemblies are fastened, and swing on pivots that are permanently fastened to the frame of the vehicle on one end, and to the steering knuckle device, causing them to move in an arc with respect to the frame or chassis, thus dragging the tires in and out over the road surface. Such movement also causes the wheels to toe in and out due to the fact that the wheels are connected by a radius rod which does not lengthen or shorten with the wheel tread.

By means of the present invention, this trouble is entirely eliminated. The wheel tread does not change but remains normal at all times. This is accomplished due to the fact that the wheels are connected on the wheel end to permanent bearings, but on the inner or frame end these connections are so constructed that they can move outward and inward with respect to the frame to compensate for the upward and downward movement of the frame. This eliminates dragging of the tires over the road surface as the frame moves upward or downward due to road shocks.

As in my previous application, the bearing point on the frame for the wheel connections is controlled by elliptical slots, guides, pivots, etc. through the medium of guides, guide boxes, elliptical bearing plates, and can operate independently or be actuated by other means as will appear hereinafter. When the structure of the present invention is utilized in automotive vehicle constructions, a straight frame can be utilized which eliminates bending of the frames in the manner currently in use. Even with a straight frame, when utilizing the present wheel suspension ample road clearance is provided.

Other and further objects and advantages of the present invention will be apparent from the following detailed description of embodiments thereof when taken together with the accompanying drawings in which.

In the various figures of the drawings, like reference numerals are used to indicate like parts.

Figure 1:
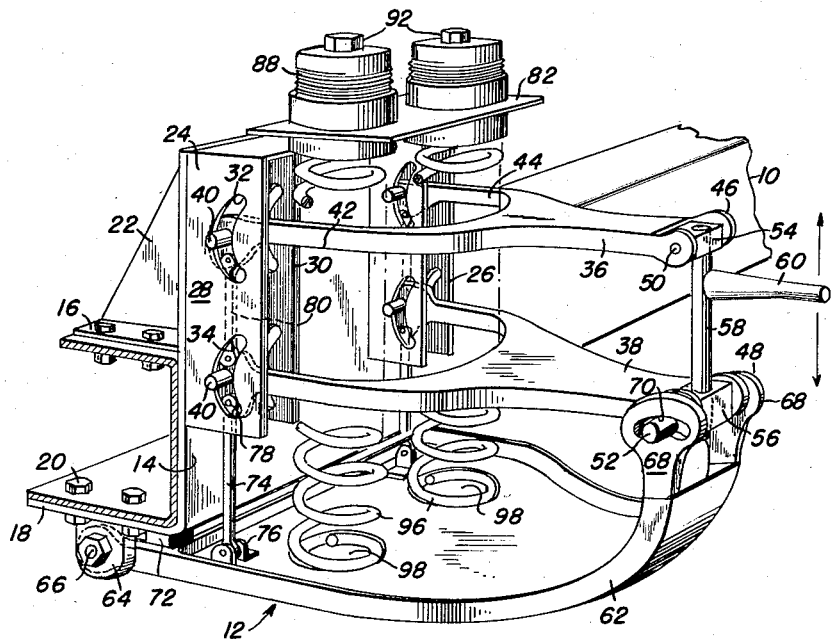
Fig. 1 is a perspective view of the wheel suspension means of my invention attached to a side frame of a vehicle.
Figure 2:
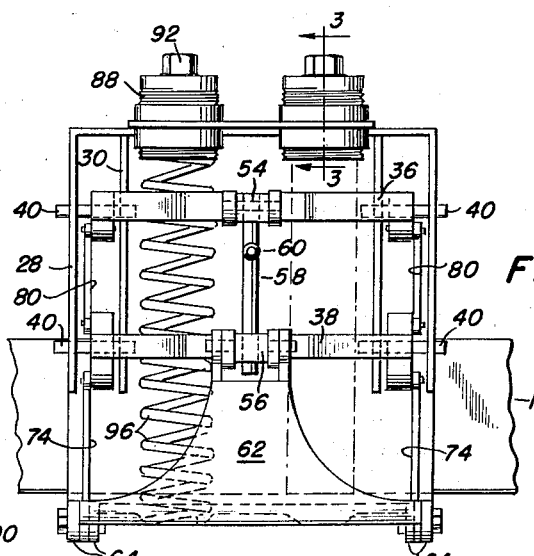
Fig. 2 is a front elevational view of the structure of Fig. 1.
Figure 3:
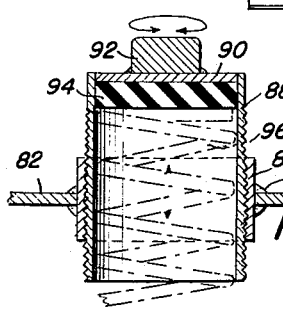
Fig. 3 is an enlarged sectional view taken on line 3—3 of Fig. 2.

The principles of operation of the invention are clearly set forth in my above-named copending application, and will not be repeated herein except insofar as necessary for a clear and proper understanding of the invention.

A portion of a longitudinal vehicle frame member is indicated at 10, which can be of any type currently in use although, as pointed out hereinbefore, when utilizing the present invention it is not necessary to bend the frame in order to provide proper road clearance for the vehicle. The wheel support device generally indicated 12 includes a back-plate 14 having upper and lower horizontal portions 16 and 18 integral therewith, and which are attached to and surround the frame 10. Nuts and bolts, such as at 20, secure the suspension device to the frame. Gusset plates 22 provide for sufficient strength of the device. Spaced guide boxes 24 and 26 are fastened to the vertical back-plate 14, and include spaced side members 28 and 30 having guide grooves 32 and 34, which are of elliptical configuration, formed therein. Upper and lower wheel yoke assemblies otherwise known as control links 36 and 38 carry at their rear ends pegs or studs 40 which are slidably retained in the guides 32 and 34. These studs extend from either side of the arms 42 and 44 of the wheel yoke assemblies, thereby maintaining the rearward ends of the yoke assemblies in proper position in the guide members.

The outer ends 46 and 48 of wheel yokes 36 and 38 are bifurcated and by means of pivot pins 50 and load arm bearings or studs 52 pivotally support wheel mounting assembly universal spindle blocks 54 and 56. These spindle blocks mount spindle bolt 58 carrying the wheel spindle 60 as shown in Fig. 1. The wheel mounting assembly includes spindle bolt, spindle blocks and wheel spindle, as well as pins 50 and studs 52 engaging the blocks 54 and 56 respectively. The openings or holes through the blocks 54 and 56 in the nature of kingpin holes are so bored at an angle as to predetermine and preset permanently the cant and caster of the front wheels.

A load arm 62, formed as a plate member, is pivotally mounted at its rear end by means of ears 64 and bolts and nuts 66. The outer end of load arm 62 has spaced ears 68, each of which has an elliptical guideway 70 therein, through which the studs or pins 52 extend. A rubber bumper 72 is mounted on plate 18 to limit movement of the load arm 62. Connecting levers 74 are pivotally mounted on load arm 62 at 76 and the upper ends are pivotally connected at 78 to the rear ends of the yoke assembly 38. Upper connecting levers 80 pivotally interconnect the rear ends of arms 38 and 36 so that upper arm 36, lower arm 38 and load arm 62 are all interconnected.

A plate 82, which is an integral portion of the frame member, has an internally threaded flange member 84 secured in and opening therein by means of welding at 86 or the like. A threaded spring casing 88 passes through the flange 84 and can be adjusted with respect thereto by rotating the same. A cap 90 is secured to the casing and a nut 92 is mounted on the top to permit rotation of the casing. A rubber washer or bumper 94 is mounted interiorly of the casing 88. A spring 96 has one end thereof mounted in casing 88, and the lower end of the spring is mounted in a spring seat 98 formed in the load arm 62. By means of this spring system tension can be adjusted and therefore the load required to move the wheel suspension system can be adjustably varied.

It will be seen in this embodiment of the invention that as the frame moves upward or downward with respect to the road and the wheel, the arms 36 and 38 which are parallel will move inwardly or outwardly governed by the position of the studs or pins 40 in the elliptical guide grooves 32 and 34. At the same time, the arms 74 and 80 transmit the movement to the load arm 62 which can pivot about its mounting and the elliptical guides 70 permit the arms 36 or 38 to give a rectilinear movement to the wheel spindle 58 and spindle 60. This movement of the upper and lower yokes 36 and 38 is operated by the load arm which is fastened to the frame at one end and the other end of the load arm being fastened to spindle block 56. The elliptical slot 70 in the load arm allows for the rise and fall of the spindle, maintaining downward pressure in line with movement of the spindle.

Figure 4:
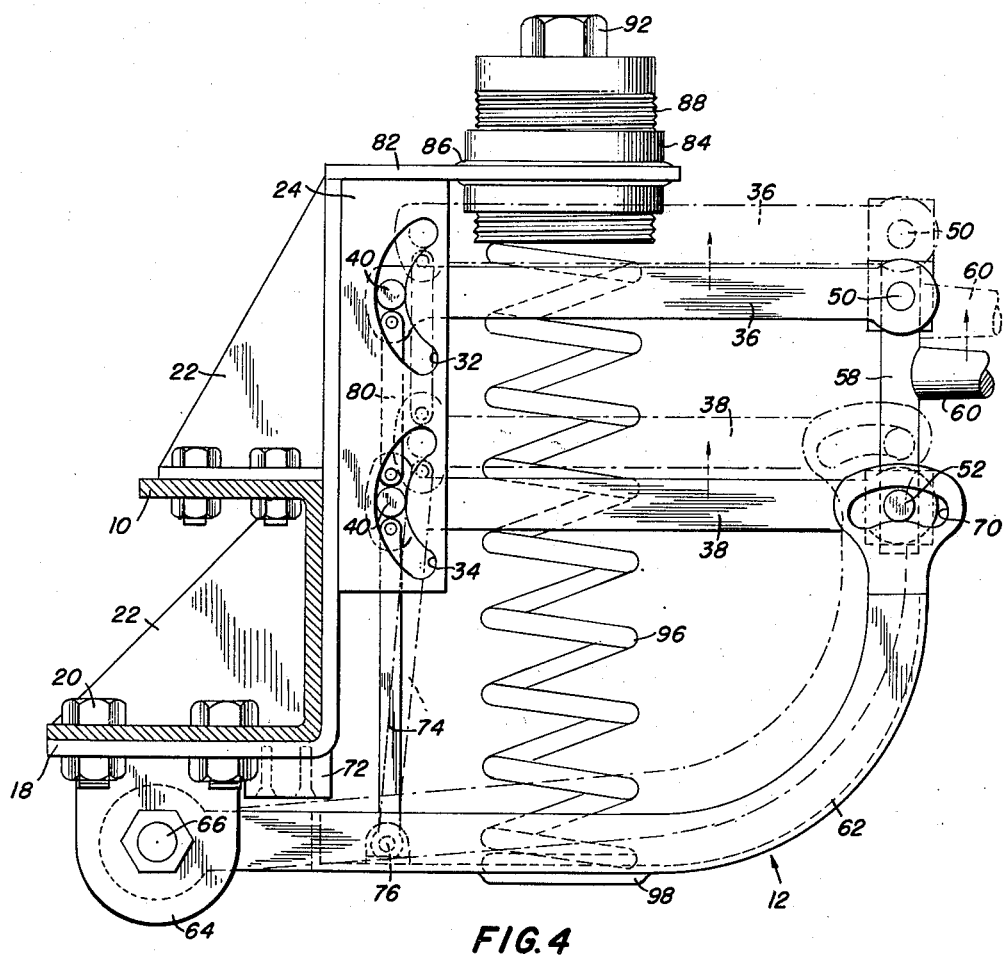
Fig. 4 is a side elevational view of the device of Fig. 1.

Different positions of the system are more clearly shown in Fig. 4 of the drawings, where it will be seen that the rectilinear movement of the spindle will be maintained at all times and thereby scrubbing of the tire is prevented. It will be noted that during movement of the wheel with respect to the frame, the arms 36 and 38 will always remain parallel with respect to one another and due to the interconnection by means of the arms 74 and 80 will simultaneously and identically move with respect to the guide grooves 32 and 34. It is this arrangement which confines the spindle to rectilinear movement.

Manifestly, minor changes in details of construction can be effected without departing from the scope and spirit of the invention as defined by the appended claims.

I claim:

1. Vehicular wheel suspension means for mounting on a vehicle frame comprising at least one control link engaging the frame, at least one symmetrical curvilinear guideway on the frame, bearing means on said control link confined in said guideway for moving said link in a curved vertical path, a load arm beneath the control link and pivoted from the frame, resilient means retained between the frame and the load arm urging the latter downwardly, a connecting lever pivotally interconnecting said link and said load arm, a wheel mounting assembly pivotally supported between the free end of each said link and said load arm, said wheel mounting assembly including at least one load arm bearing mounted on its lower end, and a symmetrical guideway on the free end of said load arm, said guideway on the frame and said guideway on the load arm yielding horizontal excursion to the lower end of the wheel mounting assembly, vertical movement of said load arm being transmitted to said link through said connecting lever and said wheel mounting assembly being restrained to movement in a rectilinear path.

2. The device according to claim 1 including a resilient means adjusting member joining the resilient means to the frame in tension adjustable contact with the load arm.

3. The device according to claim 1 including a second control link engaging the frame between the first-mentioned control link and the load arm, a second symmetrical curvilinear guideway on the frame for the second control link, bearing means on the second control link confined in said second guideway, said second control link pivotally engaging the wheel mounting assembly at the free end of said second control link and said connecting lever comprising upper and lower portions, the upper lever portion interconnecting respective control links, the lower lever portion interconnecting the control links and load arm.

References Cited in the file of this patent

UNITED STATES PATENTS

| | | |
|---|---|---|
| 2,094,582 | Chapman | Oct. 5, 1937 |
| 2,094,824 | Sanford | Oct. 5, 1937 |

FOREIGN PATENTS

| | | |
|---|---|---|
| 1,090,997 | France | Oct. 27, 1954 |